United States Patent [19]
Krivda et al.

[11] Patent Number: 5,499,451
[45] Date of Patent: Mar. 19, 1996

[54] METHOD FOR MANUFACTURE OF RAILWAY OR TRANSIT CAR SHELL SUBASSEMBLIES

[75] Inventors: John Krivda, Chicago, Ill.; Raymond L. Phebus, Jr., Highland, Ind.

[73] Assignee: Morrison-Knudsen Corporation, Boise, Id.

[21] Appl. No.: 292,070

[22] Filed: Aug. 17, 1994

[51] Int. Cl.⁶ ........................................ B23Q 17/00
[52] U.S. Cl. .................... 29/897.2; 29/407.01; 29/464; 29/559; 228/49.1
[58] Field of Search ................ 29/897.2, 407, 29/448, 464, 467, 469, 559, 281.1, 281.5; 269/40, 43, 47, 52, 53; 228/49.1

[56] References Cited

U.S. PATENT DOCUMENTS

| | | | |
|---|---|---|---|
| 1,618,536 | 2/1927 | Junkers | 29/469 |
| 1,893,456 | 1/1933 | Sykes et al. | 29/467 |
| 2,739,543 | 3/1956 | Candlin, Jr. . | |
| 3,076,231 | 2/1963 | Vertin | 29/407 |
| 3,185,112 | 5/1965 | Johnston . | |
| 3,593,675 | 7/1971 | Dominguez . | |
| 3,626,464 | 12/1971 | Van Der Sluys . | |
| 3,759,207 | 9/1973 | Terai | 29/281.1 |
| 4,053,097 | 10/1977 | Linam | 228/49.1 |
| 4,212,252 | 7/1980 | Hart et al. . | |
| 4,337,708 | 7/1982 | Peterson . | |
| 4,894,903 | 1/1990 | Woods | 29/559 |
| 4,966,082 | 10/1990 | Takeichi et al. . | |
| 5,113,769 | 5/1992 | Okuno et al. . | |
| 5,140,913 | 6/1990 | Takeichi et al. . | |
| 5,188,039 | 2/1993 | Ohmura et al. . | |

FOREIGN PATENT DOCUMENTS

| | | | |
|---|---|---|---|
| 277896 | 10/1993 | Japan | 29/407 |

*Primary Examiner*—David P. Bryant
*Attorney, Agent, or Firm*—Frank J. Dykas

[57] ABSTRACT

A method of manufacturing railway or transit car body panel subassemblies using frame component members, such as carlines 10, side posts 86, window sills 88, frame members 102, floor sills 116, roof sills 104 and floor beams 114. Each frame component is formed with reference holes integral therewith at predetermined locations. Frame component templates having corresponding jig pins for interfitting engagement with the reference holes are used to confirm dimensional tolerances regarding the size, shape and silhouette of each frame component unit. Subassembly fixtures having jig pins for interfitting engagement within the same reference holes are used for holding various component members in position for welding or fabrication of side wall, roof and floor subassemblies. Subassemblies are then fastened together to form a railway or transit car body shell of uniform dimensional size and shape. The reference holes can then be used to define cartesian coordinate locations within the shell, or as attachment points for car shell accessories.

3 Claims, 10 Drawing Sheets

METHOD FOR MANUFACTURE OF RAILWAY OR TRANSIT CAR SHELL SUBASSEMBLIES

BACKGROUND OF THE INVENTION

Technical Field. This invention relates to a method and apparatus for manufacture of railway car body shells, and more particularly to a method and apparatus for manufacture of railway car body shells of substantially uniform dimension.

Background: The typical passenger railway car in use today ranges in length from 30 to 85 feet and can easily weigh between 20,000 pounds to 200,000 pounds. Weight reduction is a significant concern, and as a result, lightweight materials, including aluminum framing and outer skins or shells are preferred since the lighter the weight of the rail car, the more fuel efficient the passenger carrying operation can be.

The typical railway car shell is constructed around a basic sub frame component which can be generally described as a U-shaped sub frame assembly having two vertical sidewall posts interconnected by a curved carline which functions as a roof support frame member or roof truss. Each shaped frame member is individually crafted, and welded in place to the side sills of the floor assembly, and interconnected, one to the other, usually by welding interconnecting door and window headers and sills. A reasonable analogy is that the railway car shell is constructed in much the same manner as any stationary building structure which uses framing members such as wall studs and roof trusses and rafters. Once the car shell frame is assembled, the outer skin is attached and it is fixed in place to the underframe and the rail wheel bogies.

Each car shell is individually fabricated piece by piece. This takes considerable skill on the part of the craftsman in aligning and insuring that the side posts and carlines are properly placed to insure that the finished railway car shell is plumb and within dimensional tolerances. The problem is typically aggravated by the fact that the car shell frame is usually formed of stainless or carbon steel pieces which, when welded together, are often times distorted by the welding process and require restraightening and repositioning.

In the typical prior art assembly process each U-shaped frame sub assemblies of the car shell frame is individually positioned relative to the previously positioned car shell frame. As a result, the acceptable tolerances for error in positioning car shell frames are relatively large and depending on whether the craftsman consistently errs on the side of positioning the shaped frames too close together or too far apart, can result in a dimensional tolerance stack up which actually alters the length of the finished railway car shell. In practice, the measurement of finished railway cars has disclosed dimensional differences of up to fourteen inches in length within a collection of railway passenger cars that are all supposed to be a standard 85 feet in length.

As a result, efforts have been made in the past to prefabricate sub assemblies of the railway car shell frame to minimize the dimensional problems due to measuring positioning errors and heat-induced distortions of the frame induced by hand crafting the car shell frames. One such example is disclosed in Peterson, U.S. Pat. No. 4,337,708 which issued on Jul. 6, 1982.

Another problem in the prior art is the difficulty in fixing an exact, replicable location within the interior volume or space of the car shell for purposes of installing inside fixtures, such as overhead luggage racks, grab rails, toilet facilities and galleys. In the prior art, the identification of the center line of the car is accomplished by taking a series of side-to-side measurements along the interior length of the car. As is the case with the fabrication of the car shell frame, this type of work requires skilled labor and results in, for all practical purposes, hand crafted, individually manufactured railway cars.

Finally, because of the significant dimensional variances between car shell to car shell on a production line, the use of interior module construction techniques is usually not feasible. If car shells were of uniform and exact dimensions and incorporated uniform, identifiable coordinate location references, the use of modular construction for such things as sleeping compartments, overhead luggage racks, food galleys and toilet facilities and the like, would be feasible and would significantly reduce the cost of construction.

Accordingly, what is needed is an apparatus and a method for constructing car shell bodies wherein the original design and dimensions can be replicated time after time within close tolerances. Another object of this invention is to eliminate or reduce the requirement for individually fitting pieces of the car shell frame or car shell frame subassemblies one to the other, relative to the other.

It is also an object of this invention to provide a method and apparatus for quickly and easily checking each subcomponent frame parts, including roof car lines, side posts, window sills, side wall frame members, floor beams, and the like, to ensure that each is of the correct dimensional size, shape and silhouette. It is another object of this invention to provide a plurality of reference holes within each of the above-listed frame members for positioning each frame member within a template for determining correct size, shape and silhouette, and for positioning each frame member within a car body subassembly fixture for producing subassembly roofs, side walls and floors of uniform dimensional tolerance.

It is further an object of this invention to provide a plurality of reference holes in each of the car body frame members which can later be used as attachment points for car body accessories and as a method of determining location within the car body shell with regard to cartesian coordinates.

DISCLOSURE OF INVENTION

These objects are achieved in a manufacturing process which begins with the development and fabrication of master or prototype carline, side post, window sill, side wall frame member, floor beam and roof and side wall sill parts of the desired shape, silhouette and size. Each of the master or prototype frame members are also provided with reference holes of predetermined size and location.

From these master or prototype frame members are prepared frame member templates, which are provided with an area defined by a surface, which in the preferred embodiment is a receiving slot, with a plurality of reference pins extending into the receiving slot for interfitting engagement within the reference holes of the various car frame members.

The templates are used to test the dimensional size, shape and silhouette of each subsequently manufactured car body frame member. Car body frame members are inserted in the appropriate template, with the reference holes of the car body frame members in interfitting engagement with the pins extending into the slots. A dimensional hand tool, having undersize and oversize tool gauges, is then used to determine whether there is uniform spacing between the edges of the car body frame member, and the sides of the template receiving area slot.

If the frame members are of dimensionally correct size, shape and silhouette, they are then attached, again using the reference holes, to interfitting pins within a subassembly fixture which holds the various parts in correct preselected, spaced relationship so that the frame members may, as the case may be, be fastened together, and outer sheeting material attached to form roof, side wall and floor subassemblies.

The floor, sidewall and roof subassemblies are then attached, one to the other, to form the car body shell. Once the car body shell has been assembled of the required floor, side wall and roof subassemblies, the reference holes can then be used to determine a cartesian coordinate position within the volume of the car shell, and also as attachment points for interior accessories and as conduit passage holes for electrical conduit.

BEST MODE FOR CARRYING OUT INVENTION

The present invention can be thought of conceptually as the use of dedicated templates and tooling to produce dimensionally uniform component parts which are then assembled, using dedicated fixtures and jigs into dimensionally uniform roof, floor, sidewall and end wall sub assemblies which can then be fastened together to form dimensionally uniform railway or transit car body shells, as opposed to the concepts of the prior art wherein the railway car body shell frame is first assembled and to which is affixed the outer sheathing. The fabrication of the car body shell roof sub assembly is herein described, in detail, and is representative of the manufacturing process and apparatus used for fabrication of all of the above enumerated subassemblies.

The manufacturing process begins, for the railway car body shell roof subassembly, with the development and fabrication of a master or prototype carline frame member of the particular desired curvature or silhouette, structural shape, dimensions and reference or tooling holes.

Figure 1:
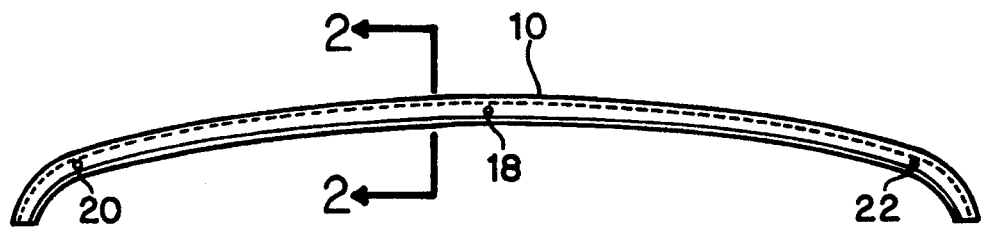
FIG. 1 is a representational side view of a typical railway car shell roof carline.
Figure 2:
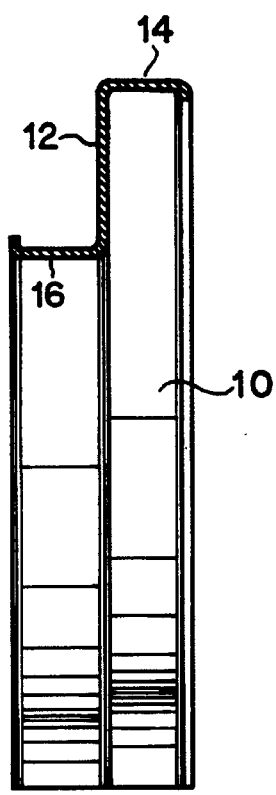
FIG. 2 is a sectional side view of the car line of FIG. 1 taken along section line 2.
Figure 3:
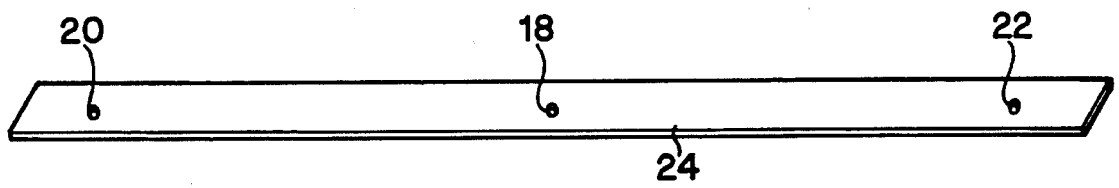
FIG. 3 is a piece of railway car roof carline flat stock with reference holes.

The first step in the manufacturing process for the rail car shell roof sub assembly is the manufacture of carlines 10, of uniform silhouette, shape and dimensional size. Carline 10, as shown in FIGS. 1, 2 and 3, is formed of a piece of flat stock 24 which may be first pre-drilled with center reference hole 18 and first and second side reference holes 20 and 22, and then bent, using a conventional forming equipment to form vertical strut 12, top plate 14 and bottom plate 16 as shown in FIG. 2. Once flat stock 24 is shaped into the proper configuration, then it is bent, using tooling and equipment to form the compound curves, or silhouette, for carline 10 as shown in FIG. 1. Reference holes could also be drilled after bending.

It should be apparent that a variety of different shape and silhouette configurations can be used for carlines 10, depending upon design criteria and preferences. Also, it should be apparent, and as will be later discussed in more detail, that reference holes 18, 20 and 22 are, in the preferred embodiment, located in just one preferred configuration. Any number of reference holes can be provided in carline 10 which may be used to advantage later during the construction process.

Figure 4:
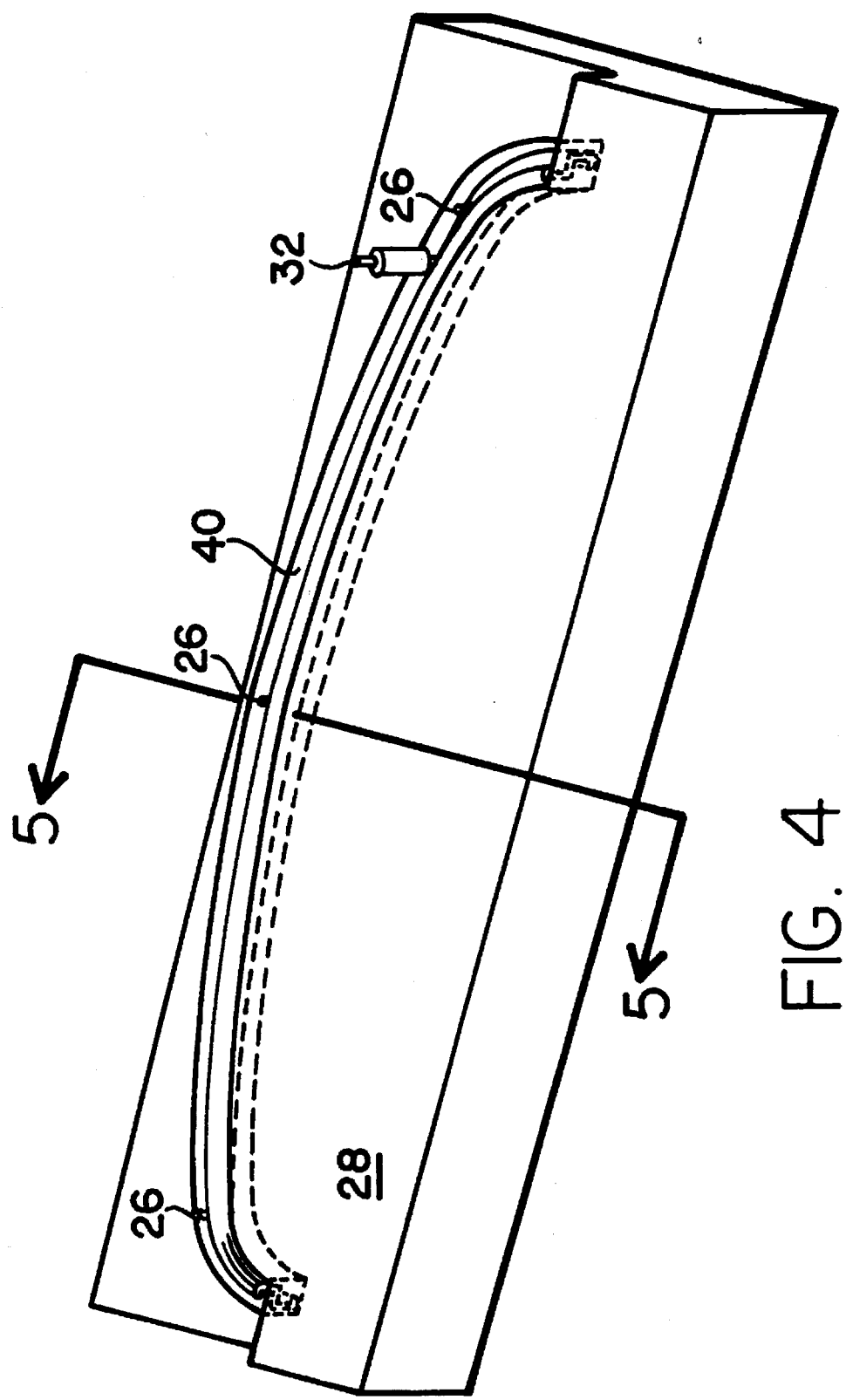
FIG. 4 is a perspective representational view of a carline template assembly with carline installed and template tool positioned.
Figure 5:
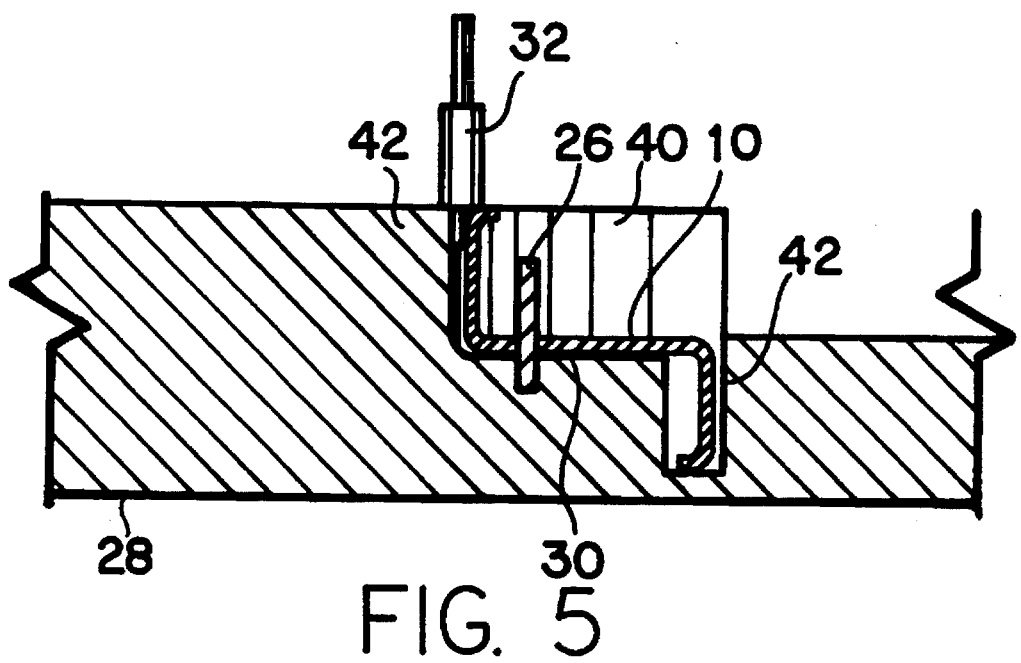
FIG. 5 is a sectional side view of the carline template assembly taken along sectional line 5.

To insure that carlines 10 are of uniform size, shape and silhouette, a template 28, as shown in FIGS. 4 and 5, is provided. Template 28 is provided with an area defined by a surface, which in the preferred embodiment is a receiving slot 40, and a plurality of reference pins 26 extending normally out from strut support surface 30, all in the conforming size, shape and silhouette to receive carlines 10 as they are fabricated to insure that they are all within dimensional tolerances. Reference pins 26 are configured to interfit within reference holes 18, 20 and 22 in carline 10. In doing so, they fix the location of carline 10 within receiving slot 40.

Figure 6:
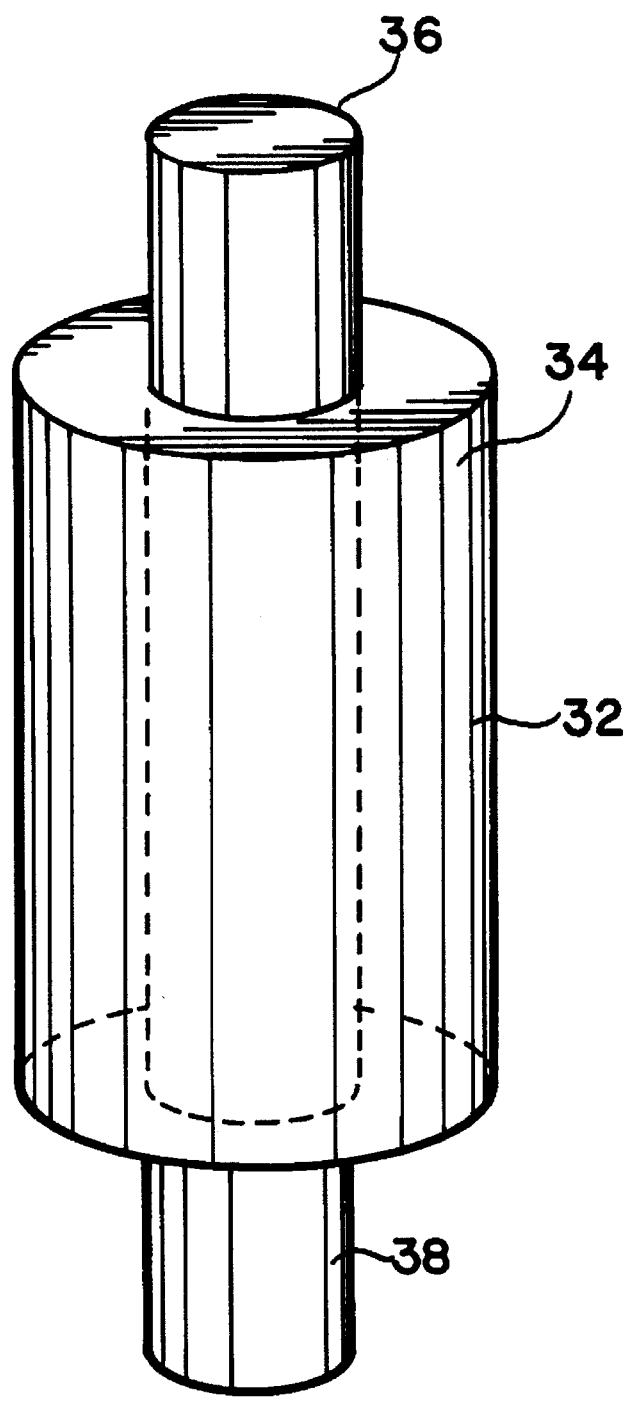
FIG. 6 is a perspective representational view of a template tool.

Once carline 10 has been properly fitted into receiving area, or slot 40, of template 28, template hand tool 32, as shown in FIGS. 4, 5 and 6, is used to double check dimensional tolerances. Dimensional hand tool 32 is formed of handle body 34, undersize test gauge 36 and oversize test gauge 38. Oversize test gauge 38 is a cylindrical plug of a pre-selected size, which, if it does not interfit between side walls 42 and top plate 14 or bottom plate 16, indicates that the top or bottom plates 14 or 16 are too far from the reference holes 18, 20 or 22, and/or that carline 10 is too large. Undersize test gauge 36 is also a cylindrical body, of a larger dimension than oversize test gauge 38. If it does interfit between side walls 42 and either top plate 14 or bottom plate 16, then it indicates that top or bottom plate 14 or 16 is at a location too close to reference holes 18, 20 or 22, or that carline 10 is too small.

A carline 10, of correct silhouette, size and shape, will interfit within the receiving area, or slot 40, in a manner in which there will be an evenly spaced, predetermined distance between the edges of carline 10 and side walls 42. The operator, using dimensional hand tool 32, should be able to interfit oversize test gauge 38 into the space between carline 10 and side walls 42 and draw it around the periphery of carline 10. If the test is successful, the operator then turns dimensional hand tool 32 over, and attempts to insert and draw around, undersize test gauge 36. If it does not fit, then carline 10 is of the correct size, shape and silhouette. In this manner, a "go or no go" test can be performed by relatively unskilled labor to insure that each carline 10 is of the dimensionally correct size, shape and silhouette for use in the fabrication of a railway car shell roof sub assembly.

Carlines 10 that are undersized, oversized or incorrectly shaped can either be reworked or discarded, as the case may be.

Figure 7:
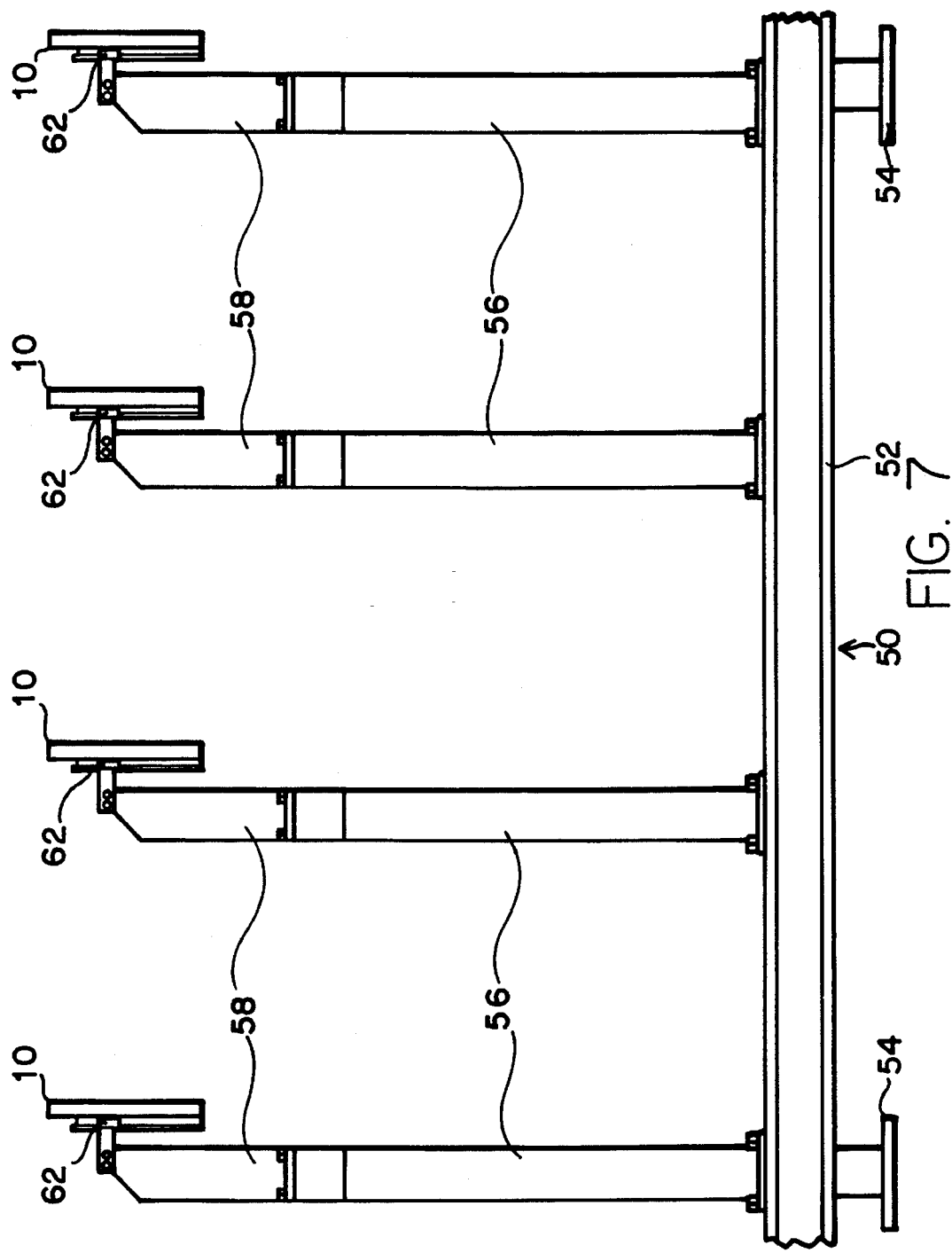
FIG. 7 is a partial side view of a railway car body roof sub assembly fixture.
Figure 8:
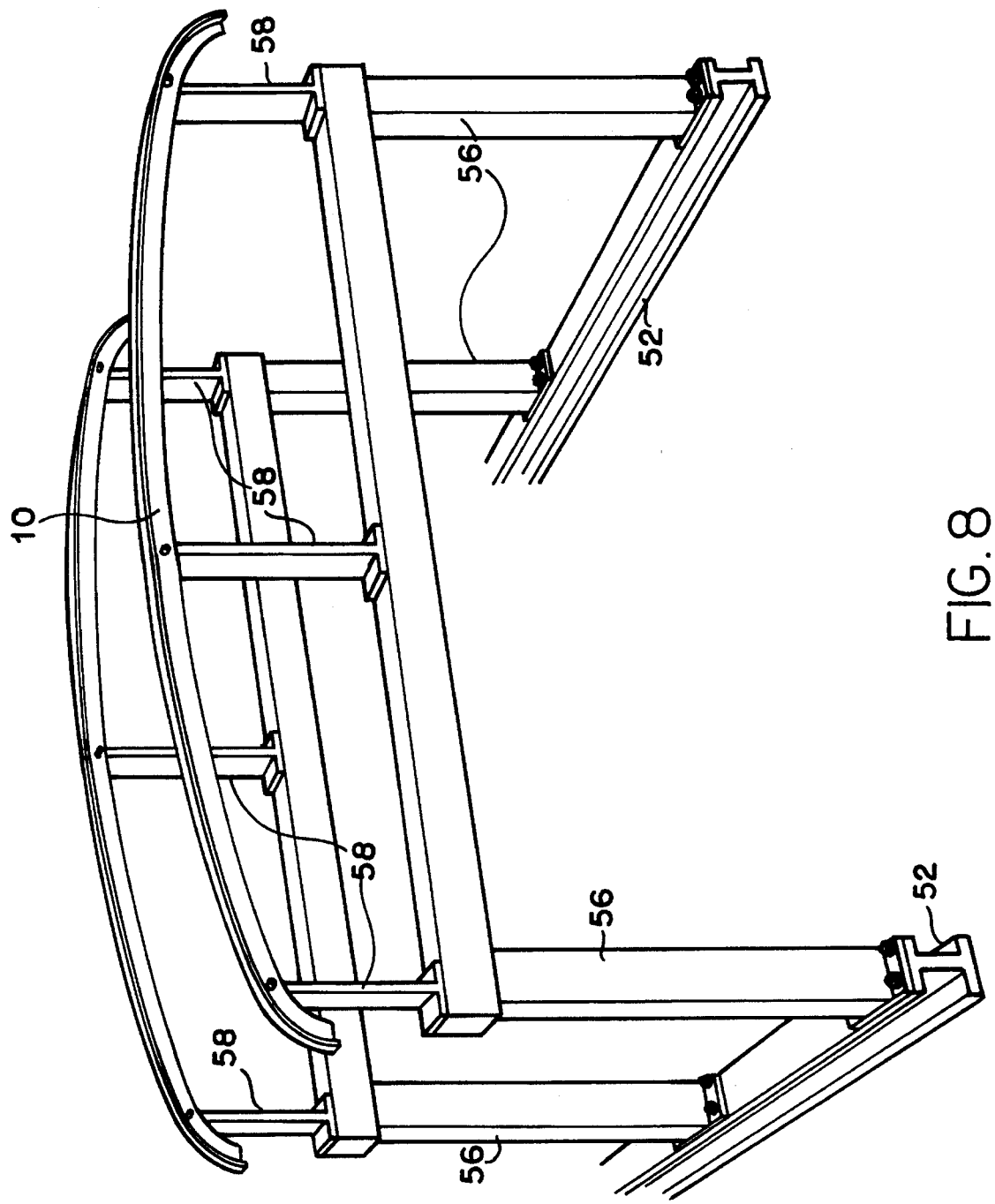
FIG. 8 is a perspective representational partial view of a railway car body roof subassembly fixture with carlines positioned.
Figure 9:
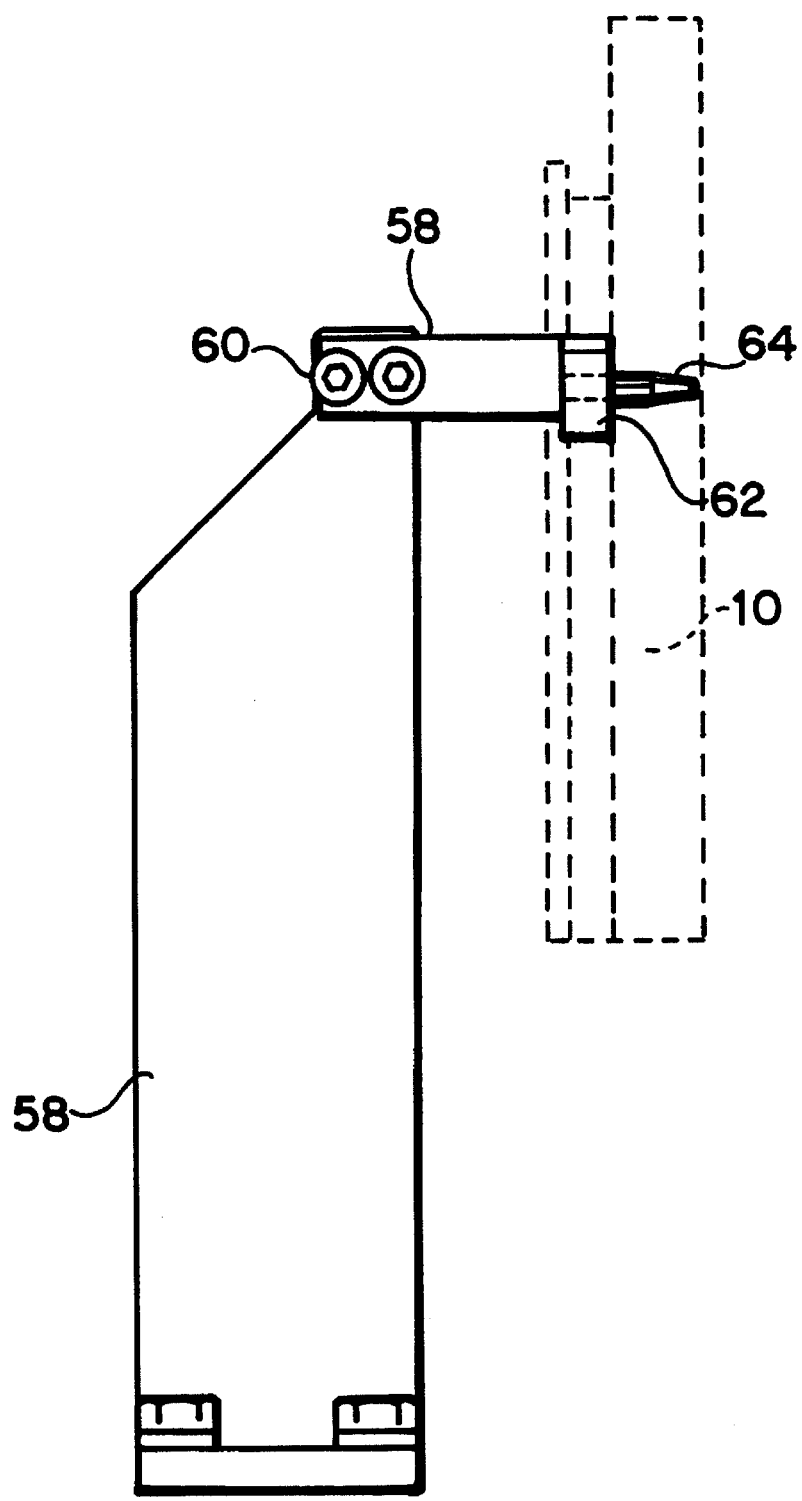
FIG. 9 is a side view of a pin mounting assembly for a carline.

Once each carline 10 has been checked for dimensional accuracy, as shown in FIGS. 4, 5 and 6, it is then installed in subassembly fixture 50, as shown in FIGS. 7, 8 and 9. Subassembly fixture 50 is formed of a base frame 52, adjustable pedestals 54 and upright frame members 56. The fixture is designed to position a plurality of pin mounting plates 62 together with jig pins 64 to upright frame members 58 by means of bolts 60, to thereby position and hold a plurality of carlines 10 in parallel, dimensionally correct, spatial alignment, one to the other. In this manner, excessive misalignment and dimensional error stack up are eliminated. Carlines 10 are held in position against mounting pin plate 62 by any conventional means, including clampable pliers or other similar hand tools.

Once the appropriate number of carlines 10 have been fixed to subassembly fixture 50, roofing sheet material, not shown, whether it be aluminum, aluminum alloy, or other metal alloy, or other composite material, can be welded or bonded to top plates 14 of carlines 10 in any conventional and well known manner.

In a like manner, side and floor car shell body subassemblies can be fabricated.

Figure 10:
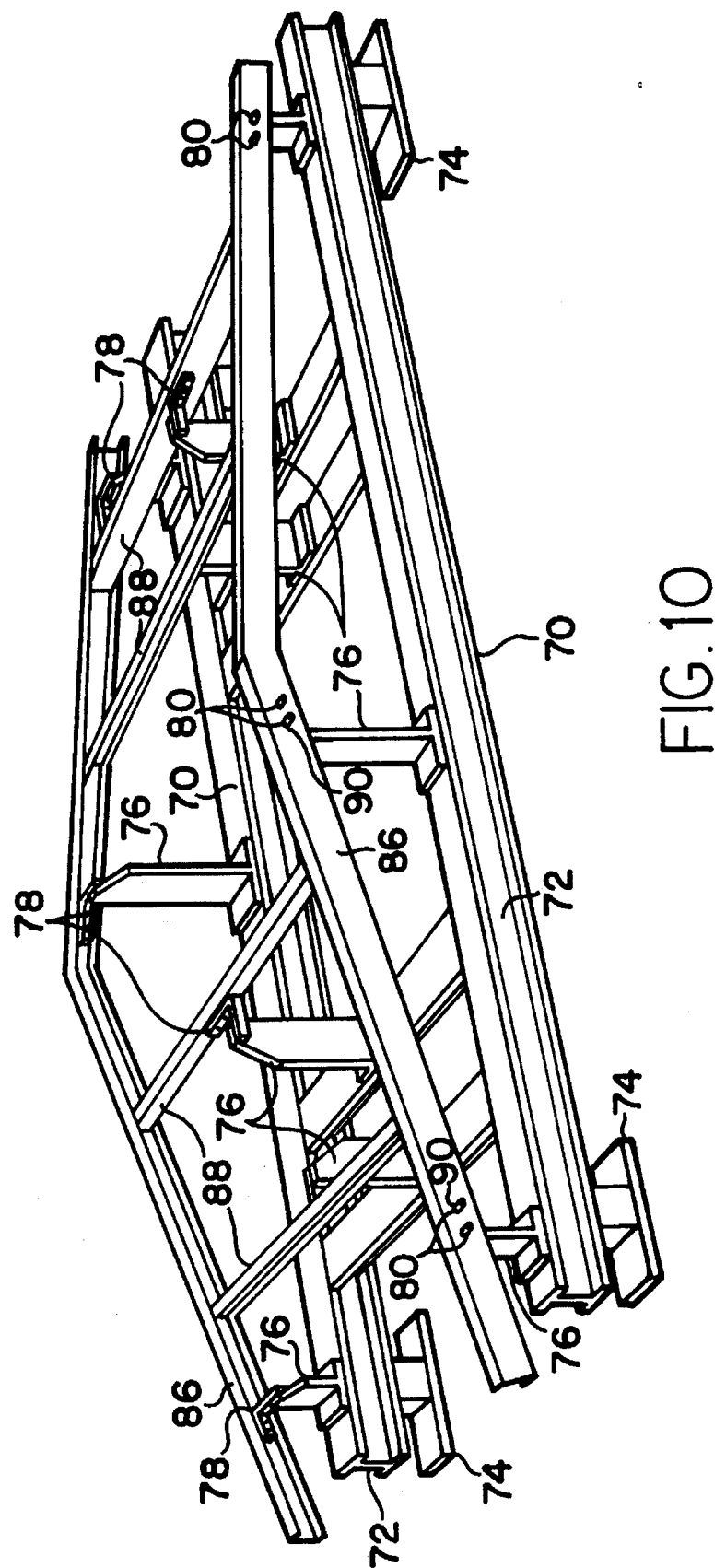
FIG. 10 is a perspective representational view of a pin mounting fixture for a side wall subassembly frame component unit.
Figure 11:
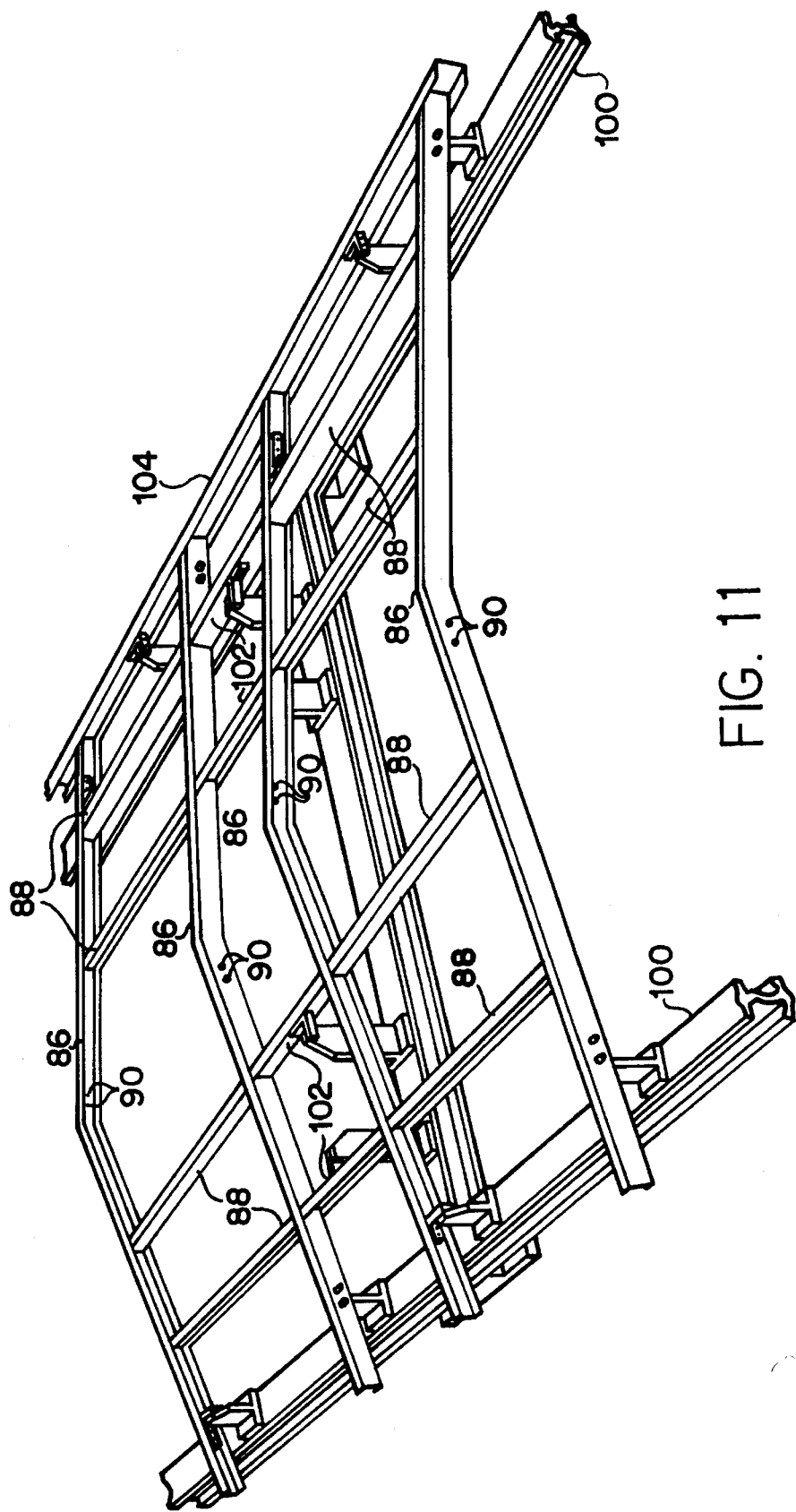
FIG. 11 is a perspective representational partial view of a railway car body side wall subassembly fixture.

Like the roof subassembly, the side wall subassemblies are formed of frame pieces, namely side posts 86, window sills 88, frame members 102 and roof rail 104. Each of these parts can be interfitted within templates and tested for dimensional accuracy regarding size, shape, silhouette and location of reference holes in the same manner as carlines 10. FIG. 10 discloses subassembly fixture 70 for use in fabrication of sidewall subassembly frame component units formed of two side posts 86 and four window sills 88. In the preferred embodiment, these pieces are welded together to form a side wall subassembly component unit which is convenient to work with. These frame component units are then, as shown in FIG. 11, used to assemble a car body shell sidewall subassembly. The component units are themselves, as shown in FIG. 10, assembled in subassembly fixture 70, using basically the same methods and procedures as previously described for the roof subassembly. Subassembly fixture 70 is formed of base frame members 72, atop adjustable pedestals 74. Upright frame members 76 extend up from base frame 72 and are used to position dual pin holding plates 78. Pins 80 extend normally out from dual pin holding plates 78 and are used, in interfitting engagement with reference holes 90 formed in both side posts 86 and window sills 88 to hold side posts 86 and window sills 88 in proper alignment in preparation for welding or other types of fastening procedures. Again, as in the case of the roof subassembly, side posts 86 and window sills 88 are held in position against dual pin holding plate 78 by means of any suitable clamping mechanism, including clampable pliers. Once the entire frame component unit is positioned in subassembly fixture 70, it can then be quickly and expeditiously welded or otherwise fastened together.

As shown in FIG. 11, these frame component units are then positioned in sidewall assembly fixture 100, wherein an entire side wall subassembly frame can be positioned, with the frame component units being attached, one to the other, by means of frame members 102. Roof rail 104 completes the side wall subassembly frame and provides an attachment point for the roof subassembly. Sheeting material, not shown, is then stretched over and fastened to the sidewall, to form the completed side wall subassembly.

It should be noted that, in the preferred embodiment, as shown in FIGS. 10 and 11, subassembly fixtures 70 and 100 position what ultimately will be vertical side walls, horizontally, preferably at waist-high level. This is, of course, not necessary to the practice of the present invention, but merely used, in the preferred embodiment, as a convenience and accommodation to those operators assembling the various component parts of the subassemblies.

Figure 12:
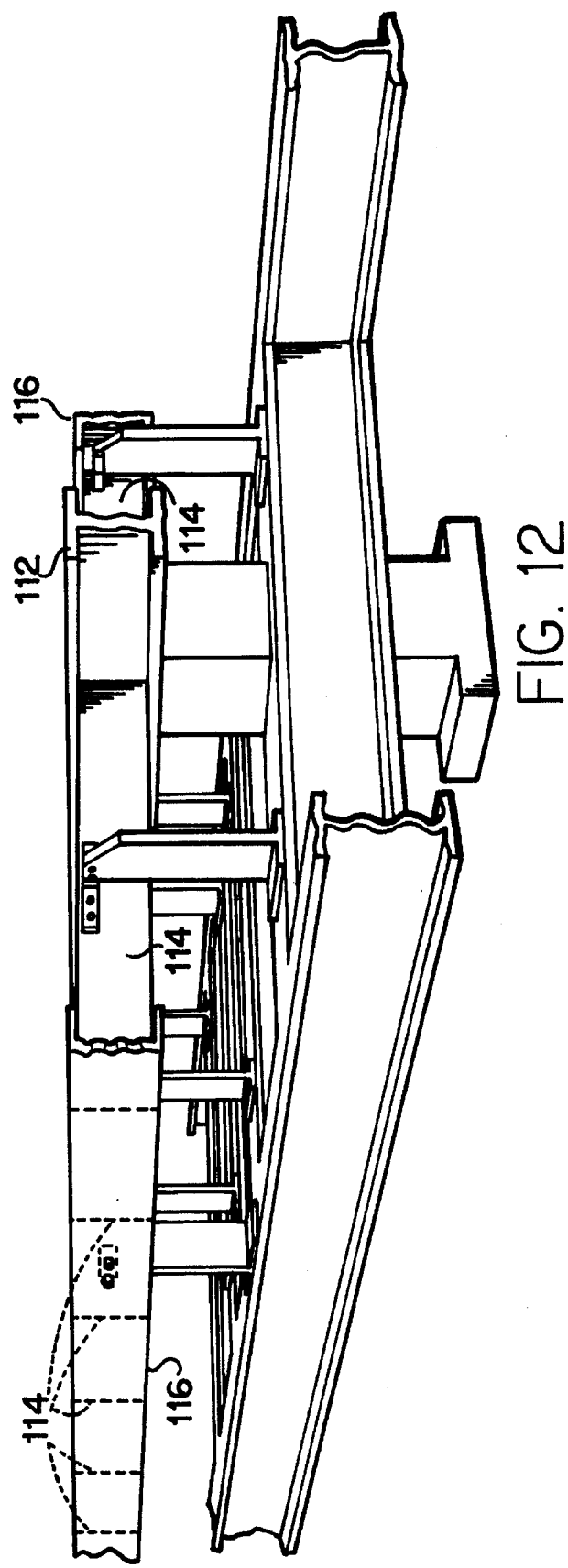
FIG. 12 is a perspective representational partial view of a railway car body floor subassembly fixture.

In a like manner, a floor subassembly formed of compression post 112, transverse floor beams 114 and side sills 116, can be assembled and fabricated, as shown in FIG. 12, into floor subassembly fixture 120.

Once the floor and both side wall subassemblies for the railway car shell body have been fabricated, the side wall car shell subassemblies are removed from their corresponding subassembly fixtures, and positioned and attached to the side sills 116 of the floor subassembly in a conventional and well known manner. The roof subassembly is then positioned and attached to the roof rails 104 of the sidewall subassemblies to complete the basic railway car shell body.

The reference holes, previously used to locate the various component parts within the appropriate templates for dimensional checking, and then again for locating the component parts within the various subassembly fixtures, can then be used for other useful purposes. For example, center reference holes 18 in carlines 10 will define a center line down the length of the railway car shell body. In a like manner, first and second side reference holes 20 and 22 in carlines 10 could have, during initial design, been positioned, such that once the railway car shell body has been assembled, to provide attachment points for luggage rack supports, or the like. In a like manner, side post reference holes 90 can be used as attachment points for modular subassemblies, such as railway car galleys, sleeping compartments and the like, or even as pass-through holes for electrical wire conduit.

Thus, in the practice of the invention in the preferred embodiment, not only is a rail or transit car shell of uniform dimension and tolerance assembled, but also, the reference holes in the various component parts, necessary to the practice of the invention, become useful reference points in the sense of a cartesian coordinate system, and also as attachment points for various accessories to be later installed in the finished rail or transit car.

While there is shown and described the present preferred embodiment of the invention, it is to be distinctly understood that this invention is not limited thereto but may be variously embodied to practice within the scope of the following claims.

We claim:

1. A method of manufacturing a railway or transit car body panel subassembly, said panel subassembly for assembly together with other panel subassemblies into a rail or transit car body, said panel subassembly formed of structural frame members and sheeting material, using a car body panel subassembly jig having a plurality of tooling pin sets held at preselected and fixed locations for holding a plurality of structural frame members in preselected spaced relationship, which comprises:

forming a plurality of structural frame members, each having a set of reference holes formed therethrough for interfitting engagement with a corresponding tooling pin set of said subassembly jig;

positioning and holding said plurality of structural frame members in preselected spaced relationship by interfitting each tooling pin set within the set of reference holes of each of a corresponding structural frame member;

positioning the sheeting material against said plurality of positioned and held structural frame members; and attaching the sheeting material to said plurality of positioned and held structural frame members.

2. The method of claim 1, wherein the step of forming a plurality of structural frame members, each having a set of reference holes formed therethrough for interfitting engagement with a corresponding tooling pin set of said subassembly jig, further comprises forming the reference holes at locations which will serve as coordinate reference locations within an assembled rail or transit car body.

3. The method of claim 1, using a template formed of a plate having a groove therein with parallel side walls, said groove configured in size, shape and silhouette to receive a structural frame member of dimensionally correct size, shape and silhouette, in interfitting relationship, with said structural frame member evenly spaced a predetermined distance from the side walls, said template including a plurality of locating pins, attached to the plate, and extending into said groove, for interfitting engagement within the reference holes of said structural frame member, wherein the step of forming a plurality of structural frame members, each having a set of reference holes formed therethrough for interfitting engagement with a corresponding tooling pin set of said subassembly jig, further comprises:

forming a plurality of structural frame members of predetermined, dimensionally correct size, shape and silhouette, said structural frame members further having formed therethrough a plurality of reference holes at predetermined locations;

checking the dimensional size, shape and silhouette of each structural frame member by interfitting each structural frame member within said groove in said template such that said locating pins are interfittingly engaged within corresponding reference holes; and measuring the relational distance between the groove side walls and the interfitting structural frame member to determine if said relational distance is substantially the same as the evenly spaced predetermined distance.

* * * * *